Dec. 26, 1967     T. M. GORDON, JR     3,360,667

FIELD CONTROL MEANS FOR DYNAMO ELECTRICAL MACHINES

Filed May 24, 1965

INVENTOR.

THURLOW M. GORDON JR.

United States Patent Office 3,360,667
Patented Dec. 26, 1967

3,360,667
FIELD CONTROL MEANS FOR DYNAMO ELECTRICAL MACHINES
Thurlow M. Gordon, Jr., Hop Brook Road, Brookfield, Conn. 06804
Filed May 24, 1965, Ser. No. 458,139
5 Claims. (Cl. 310—154)

My invention is directed toward field control means for dynamo electrical machines comprising direct current motors and generators.

It is an object of my invention to provide new and improved field control means for varying the field strength of dynamo electrical machines which employs movable permanent magnets and does not use wound field coils. In a direct current motor a change in field strength varies the speed of rotation, whereas in a generator it varies the voltage of the generated current.

Still another object is to provide new and improved field control means of the character indicated which eliminates the use of a variable resistor and reduces heat dissipation by eliminating the field coils and the heat producing current which normally flows therethrough.

All of the foregoing and still further objects of my invention will now be explained with reference both to this specification and to the accompanying drawings, wherein.

Figure 1:
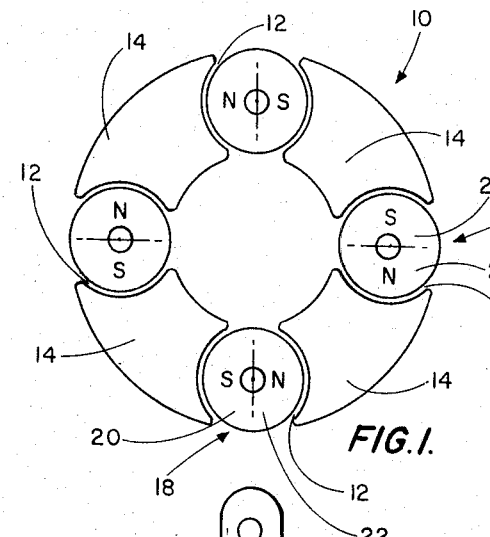
FIG. 1 is an end view of pole pieces and permanent magnets as used in my invention with control gears removed, as taken along 1—1 in FIG. 2.
Figure 2:
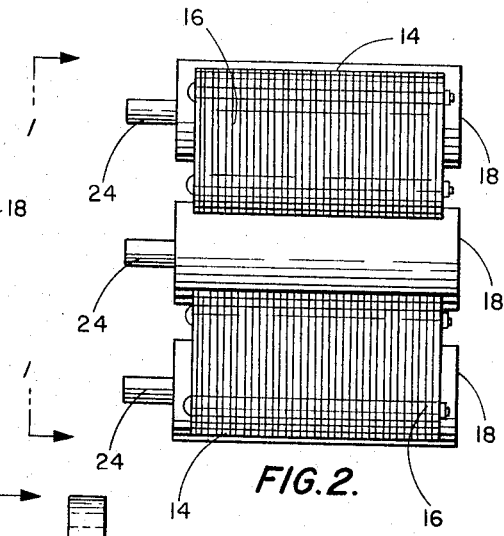
FIG. 2 is a side view of the pole pieces and magnets shown in FIG. 1.
Figure 3:
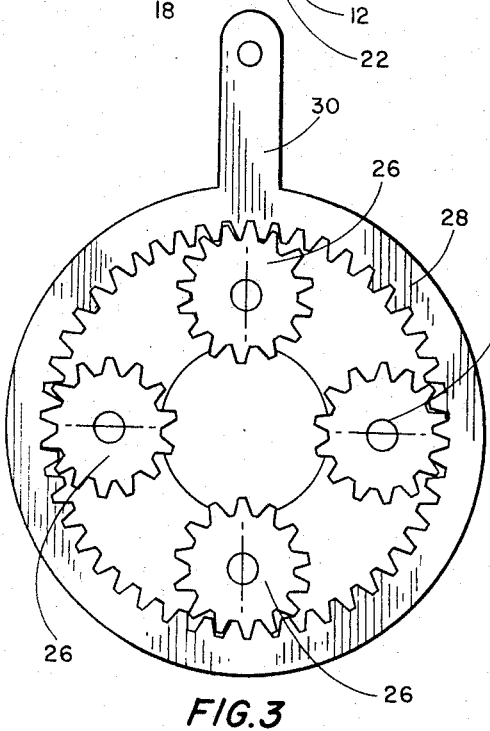
FIG. 3 is an end view of the pole pieces and magnets of my invention together with associated control gears as taken along 3—3 in FIG. 4.
Figure 4:
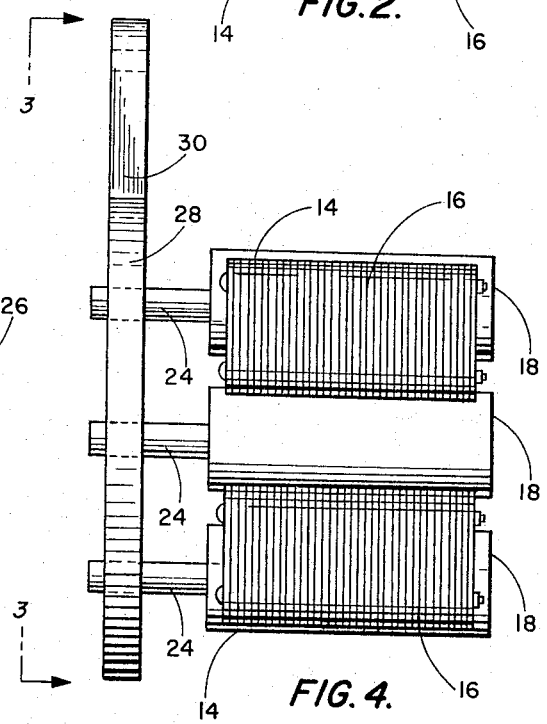
FIG. 4 is a side view of the pole pieces, magnets and control gears shown in FIG. 3.
Figure 5:
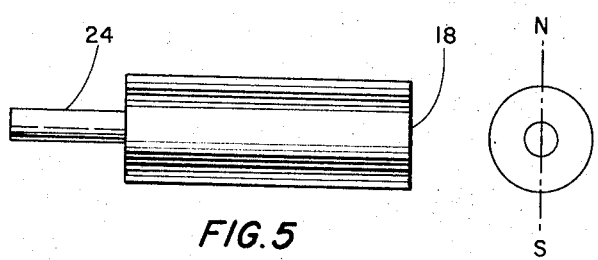
FIG. 5 is a side view of one of the magnets together with its shaft extension as shown in the preceding figures.

Referring now to FIGS. 1–5, there is shown a hollow cylinder identified generally at 10 and having a plurality (in this example, four) of equidistantly spaced bores 12 extending through the cylinder in the direction of its axis to divide the cylinder into a like plurality of adjacent arcuate cylindrical sections 14 extending in the direction of the cylindrical axis. Each section 14 constitutes a pole piece and is formed of soft iron. Each section 14 is made of a stack of laminations 16 held together by bolts and nuts as shown in FIGS. 2 and 4.

I further provide a like plurality of cylindrically shaped bar magnets identified generally at 18, each magnet being disposed within a corresponding bore. Each magnet is a permanent magnet with opposite polarities on diametrically opposite sides of a plane through its axis. Said planes are indicated by dash-dotted lines in FIG. 1.

Each magnet 18 has an axial bore through which a shaft 24 extends, a portion of each shaft extending away from its magnet and having a circular gear 26 disposed thereabout and affixed thereto. Each shaft is made of non-magnetic material.

A sun gear 28 having an inner toothed rim is disposed about all of the gears 26 and has its inner teeth engaging the outer teeth of all of the gears 26 in spaced apart positions whereby when handle 30 secured to gear 28 is rotated through a selected arc, all of the bar magnets are rotated in unison through the same arc.

In operation, the pole pieces 14 are magnetized by the bar magnets 18. By rotating handle 30, thereby rotating the magnets 18, the polarity of the magnetized pieces 14 can be made zero or reversed completely. Moreover the strength of the magnetic field in the pieces can be varied as desired. An armature generally cylindrical in shape (not shown) is disposed within the hollow cylinder 10 along the axis thereof and rotates in conventional manner. In the case of a motor, the speed of rotation is controlled by operation of handle 30. In a generator, operation of handle 30 controls the voltage of the generated current. By this means, the field coil is eliminated and the variable resistance for controlling the current and hence the magnetic field of the field coil is eliminated. If desired, the number of pole pieces and magnets can be varied from that shown, as for example a two pole machine.

While I have described my invention with particular reference to the drawings, my protection is to be limited only by the terms of the claims which follow.

Having thus described my invention, I claim as new and desire to secure by Letters Patent:

1. In a permanent magnet dynamo electrical machine, a hollow cylinder having a plurality of equidistantly spaced bores extending through the cylinder in the direction of the axis to divide the cylinder into a like plurality of adjacent arcuate cylindrical sections extending in the direction of the axis, each section constituting a pole piece and being composed of soft iron, and a like plurality of cylindrical permanent magnets, each magnet being placed in one of said bores, and means for moving said magnets within said bores.

2. A machine as set forth in claim 1, each of said magnets having opposite polarities on diametrically opposite sides of a plane through its axis.

3. A machine as set forth in claim 1, said means being adapted to rotate said magnets about their own axis.

4. A machine as set forth in claim 3 including additional means coupled to said first named means and manually operable to rotate all of said magnets in unison through the same rotational arc.

5. A machine as set forth in claim 4 wherein said first named means includes a shaft extending axially from each of said magnets and a circular gear concentrically disposed about each of said shafts and affixed thereto and wherein said additional means includes a sun gear engaging at spaced apart positions each of said circular gears.

References Cited

UNITED STATES PATENTS

| | | | |
|---|---|---|---|
| 1,044,827 | 11/1912 | Smith | 310—190 |
| 2,207,304 | 7/1940 | Rosenberg | 310—181 |
| 2,243,616 | 5/1941 | Bing et al. | 310—191 |
| 2,670,448 | 2/1954 | Bell et al. | 310—154 |

MILTON O. HIRSHFIELD, *Primary Examiner.*
L. L. SMITH, *Assistant Examiner.*